US008484960B2

(12) United States Patent
Vansickle

(10) Patent No.: US 8,484,960 B2
(45) Date of Patent: Jul. 16, 2013

(54) TORQUE CONVERTER WITH CENTERED TURBINE

(75) Inventor: Michael Vansickle, Akron, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1021 days.

(21) Appl. No.: 12/217,785

(22) Filed: Jul. 9, 2008

(65) Prior Publication Data
US 2009/0013682 A1   Jan. 15, 2009

Related U.S. Application Data

(60) Provisional application No. 60/959,263, filed on Jul. 12, 2007.

(51) Int. Cl.
*F16D 33/18* (2006.01)
(52) U.S. Cl.
USPC .......................................................... 60/366
(58) Field of Classification Search
USPC ........................................... 60/366; 192/3.28
See application file for complete search history.

(56) References Cited

U.S. PATENT DOCUMENTS

| 4,353,444 | A | * | 10/1982 | Bionaz .......................... 192/3.28 |
| 5,667,043 | A | | 9/1997 | Dehrmann et al. |
| 5,904,231 | A | * | 5/1999 | Arhab et al. .................. 192/3.28 |
| 6,065,577 | A | | 5/2000 | Arhab et al. |
| 6,079,529 | A | * | 6/2000 | Hinkel et al. ................. 192/3.28 |
| 6,196,551 | B1 | * | 3/2001 | Zellers ............................. 60/366 |
| 6,688,441 | B1 | * | 2/2004 | Arhab et al. .................. 192/3.29 |
| 2004/0172936 | A1 | | 9/2004 | Mueller et al. |

* cited by examiner

*Primary Examiner* — F. Daniel Lopez
(74) *Attorney, Agent, or Firm* — Davidson, Davidson & Kappel, LLC

(57) ABSTRACT

A torque converter for connecting to an input shaft of a transmission including a housing, a turbine housed in the housing, a turbine hub connected to the turbine, the input shaft of the transmission being located within the turbine hub, a piston plate connected to the housing so as to be radially fixed with respect to the housing, and a bushing connected to the piston plate and the turbine hub, the piston plate via the bushing and the turbine hub centering the turbine and the input shaft of the transmission. The bushing may have a radial flange.

12 Claims, 2 Drawing Sheets

TORQUE CONVERTER WITH CENTERED TURBINE

Priority to U.S. Provisional Patent Application Ser. No. 60/959,263, filed Jul. 12, 2007 is claimed, the entire disclosure of which is hereby incorporated by reference herein.

The present invention relates generally to torque converters and more particularly to torque converters with centered turbines.

BACKGROUND

U.S. Pat. No. 5,667,043, hereby incorporated by reference herein, describes a torque converter with a lock-up clutch that is located axially between the outside of the turbine wheel and the inside opposite it of the converter housing which forms the connection between the pump wheel and the internal combustion engine.

U.S. Pat. No. 6,065,577 describes a lock-up clutch with fastening holes and tongue extending through the ends of the tongues.

FIG. 1 shows a prior art torque converter 18 including a converter housing 4. Converter housing 4 encloses a turbine 10, a pump 12, and a piston plate 2. Piston plate 2 is axially supported with a thrust washer 14 between piston plate 2 and a turbine hub 16. Turbine hub 16 is connected by a ball bearing 8 to a bearing flange 6. Torque converter 18 uses ball bearing 8 to center turbine 10 to converter housing 4. Bearing flange 6 is welded to converter housing 4. Bearing flange 6 is then machined, if necessary, after bearing flange 6 is welded to ensure concentricity of bearing flange 6 center.

SUMMARY OF THE INVENTION

The present invention provides a torque converter for connecting to an input shaft of a transmission comprising a housing, a turbine housed in the housing, a turbine hub connected to the turbine, the input shaft of the transmission being located within the turbine hub, a piston plate connected to the housing so as to be radially fixed with respect to the housing, and a bushing connected to the piston plate and the turbine hub, the piston plate via the bushing and the turbine hub centering the turbine and the input shaft.

The present invention also provides a torque converter for connecting to an input shaft of a transmission comprising a housing, a turbine housed in the housing, a turbine hub connected to the turbine, the input shaft of the transmission being located within the turbine hub, a piston plate connected to the housing, and a bushing having a radial flange and connected to the piston plate and the turbine hub.

Figure 2:
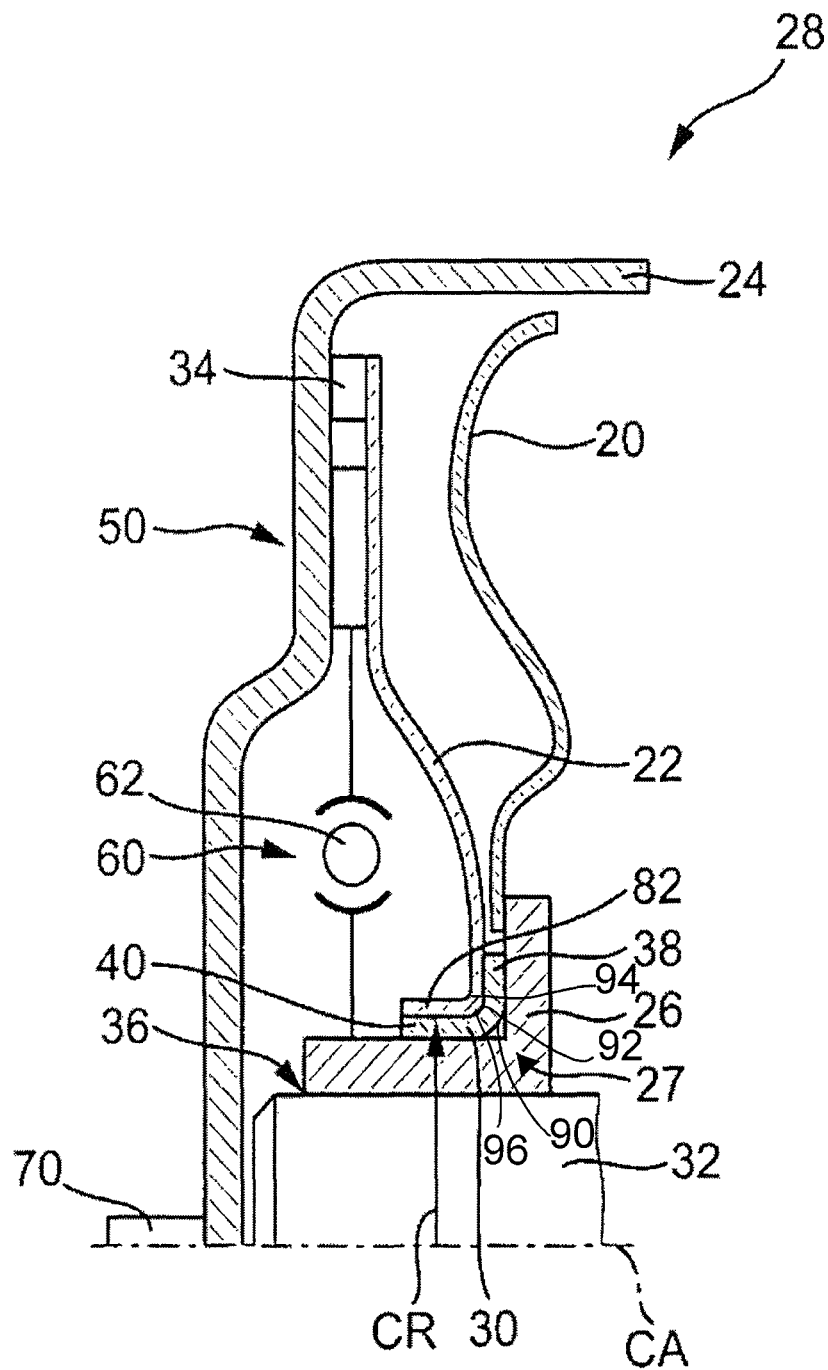

Further features and advantages of the invention will become apparent from the following detailed description taken in conjunction with the accompanying drawing, in which:

FIG. 2 illustrates one embodiment of a torque converter according to the present invention.

DETAILED DESCRIPTION

Figure 1:
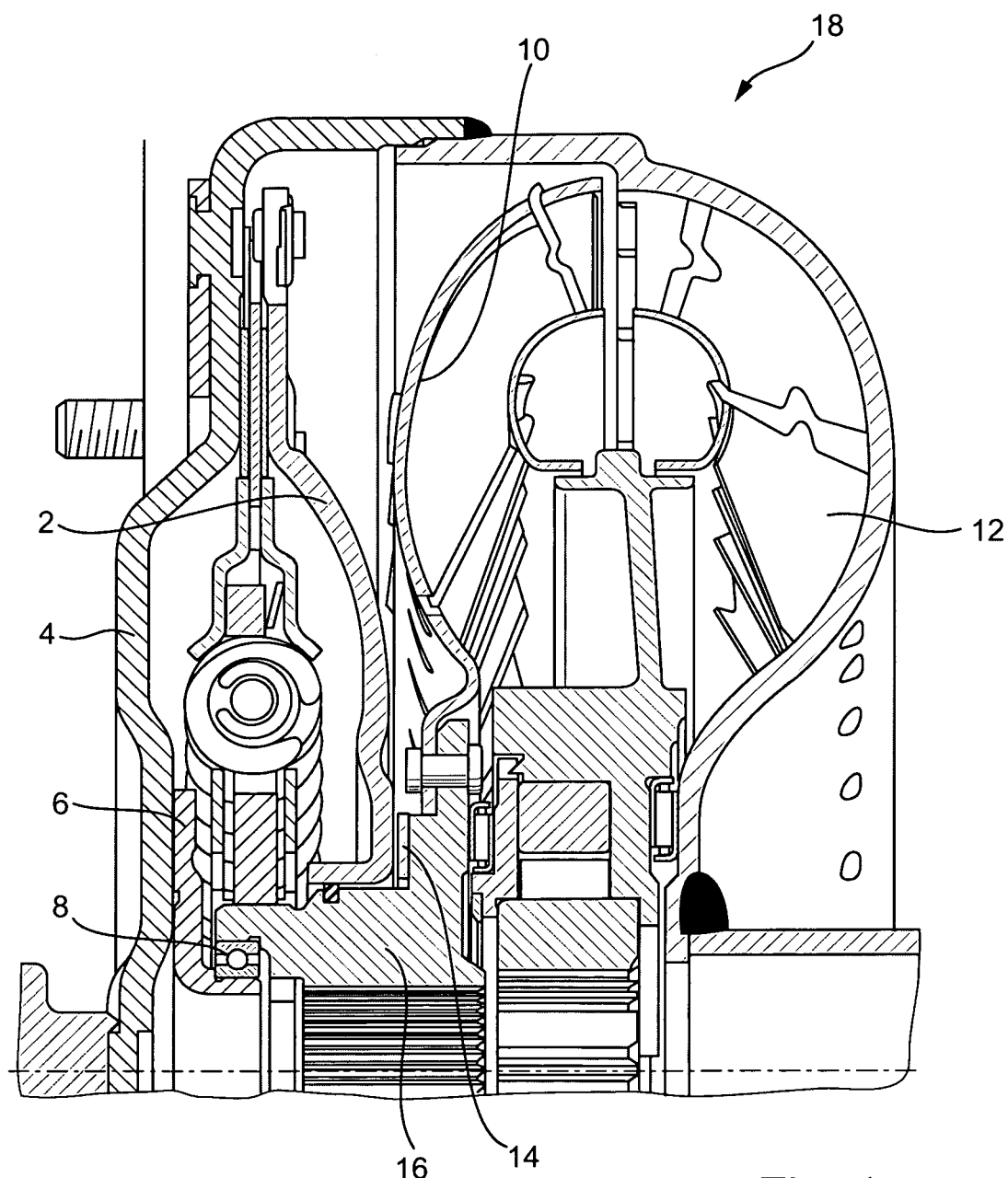
FIG. 1 illustrates prior art of the upper half of a longitudinal section through a torque converter with ball bearings and a thrust washer.

FIG. 2 shows a portion of a torque converter 28 embodying the present invention. U.S. Patent Publication No. 2004/0172936, is hereby incorporated by reference herein, to provide details of torque converter 28. Torque converter 28 includes a converter housing 24, a turbine 20, a turbine hub 26, a clutch 50 with a piston plate 22, and a damper 60 which may have a plurality of circumferential spaced springs 62. A pilot 70 of housing 24 centers housing 24 to the engine crank shaft. Piston plate 22 is connected to converter housing 24 using a leaf spring 34 so that piston plate 22 and converter housing 24 are fixed radially with respect to one another. Leaf springs 34 center piston plate 22 relative to housing 24. A centering bushing 30 can be formed into an "L" shape having a base axial section and a radial flange 38. Centering bushing 30 centers turbine hub 26 relative to piston plate 22. Turbine hub 26 in turn centers input shaft 32 of a transmission. Turbine hub 26 also centers turbine 20 as turbine 20 is fixed to turbine hub 26. As opposed to the FIG. 1 torque converter, turbine hub 26 thus centers turbine 20 and input shaft 32 of the transmission relative to the engine crankshaft. Using leaf spring 34 eliminates the need for bearing flange 6 and ball bearing 8 seen in FIG. 1. Centering bushing 30 also can replace thrust washer 14 in FIG. 1.

During operation, housing 24 is driven for example by an engine. When clutch 50 is disengaged, torque will be transmitted through a pump and then hydraulically via turbine 20 to turbine hub 26 and shaft 32. When clutch 50 is engaged, torque is transmitted directly through damper 60 to turbine hub 26 and shaft 32. Depending on relative fluid pressure on sides of piston 22, clutch 50 is engaged or disengaged.

The centering diameter on converter housing 24 side is thus the diameter at bore of piston plate 22 and a centering radius CR is defining from the central axis CA to an inner radial surface 40 of the bore of an inwardly curved section 82 of piston plate 22. The concentricity of torque converter 28 is determined by the true position of the connections on converter housing 24 and piston plate 22, such as rivets. While the present invention eliminates bearing 8 in FIG. 1, required tolerance may be higher, since once connected piston plate 22 is difficult to machine for concentricity. On a side of turbine 20, similar to the prior art, the centering diameter will be formed at the same time as a spline 36, between turbine hub 26 and input shaft 32. Therefore these tolerances are expected to be comparable.

As shown in FIG. 2, bushing 30 fits in a corner 90 of turbine hub 26 and a cross-section of bushing 30 has an L shape, with an outside corner 92 of the L shape fits directly against corner 90 of turbine hub 26. A cross-section of an end of piston plate 22 connected to bushing 30 has an L shape and an outside corner 96 of the L shape of piston plate 22 fits directly against an inside corner 94 of the L shape of bushing 30.

The present invention provides a simpler less expensive solution to the problem of centering turbine 20 and input shaft 32 to converter housing 24. A bushing, which is a round tube made of reduced-friction material, can be used. In the preferred embodiment the bushing is flanged to the axial section too. The present invention does not require an additional weld flange or expensive ball bearings. Furthermore, the design requires fewer components and fewer manufacturing steps to assemble then the prior art. Finally, a blind assembly operation is removed, thus aiding the assembly of the torque converter.

The disadvantages of the invention may include increased drag in converter 28 and higher tolerances between converter housing 24 and turbine 20, but lead to a simpler, more cost effective design.

What is claimed is:

1. A torque converter for connecting to an input shaft of a transmission comprising:

a housing;

a turbine housed in the housing;

a turbine hub connected to the turbine, the input shaft of the transmission being located within the turbine hub;

a piston plate;

a connector extending axially from the piston plate to the housing, away from the turbine, so as to radially fix the piston plate with respect to the housing; and a bushing connected to the piston plate and the turbine hub, each of the turbine hub, the piston plate and the bushing including a cross-section having an L-shaped portion, all of the L-shaped portions being aligned with each other and facing the same direction, the L-shaped portion of the piston plate centering the turbine and the input shaft of the transmission, through the L-shaped portion of the bushing and the L-shaped portion of the turbine hub, the L-shaped portion of the bushing being formed of a radial flange and an axial flange, both the radial flange and the axial flange contacting the turbine hub.

2. The torque converter as recited in claim 1 wherein the connector is a leaf spring connection.

3. The torque converter as recited in claim 1 wherein the bushing fits in a corner of the turbine hub.

4. The torque converter as recited in claim 1 wherein the bushing is insertable onto the piston plate after the piston plate is connected to the housing.

5. The torque converter as recited in claim 1 wherein axial flange of the bushing includes an inner radial surface defining a bore, the inner radial surface extending axially away from the radial flange toward the housing.

6. A torque converter for connecting to an input shaft of a transmission comprising:

a housing;

a turbine housed in the housing;

a turbine hub connected to the turbine, the input shaft of the transmission being located within the turbine hub;

a piston plate connected to the housing;

a connector extending axially from the piston plate to the housing, away from the turbine, so as to radially fix the piston plate with respect to the housing; and a bushing having a radial flange and an axial flange forming an L-shaped portion, the bushing connected to the piston plate and the turbine hub, the bushing being connected to an end of the piston plate such that the bushing stops the end of the piston plate from axially moving away from the housing and toward the turbine, both the radial flange and the axial flange of the bushing contacting the turbine hub.

7. The torque converter as recited in claim 6 wherein the bushing fits in a corner of the turbine hub.

8. The torque converter as recited in claim 6 wherein an end of the piston plate connected to the bushing has an L shape.

9. The torque converter as recited in claim 6 wherein the axial flange of the bushing includes an inner radial surface defining a bore, the inner radial surface extending axially away from the radial flange toward the housing and away from the turbine.

10. The torque converter as recited in claim 6 wherein the connector is a leaf spring.

11. A torque converter for connecting to an input shaft of a transmission comprising:

a housing;

a turbine housed in the housing;

a turbine hub connected to the turbine, the input shaft of the transmission being located within the turbine hub;

a piston plate connected to the housing so as to be radially fixed with respect to the housing;

a connector extending axially from the piston plate to the housing, away from the turbine, so as to radially fix the piston plate with respect to the housing; and a bushing including a radial flange and an axial flange forming an L-shaped portion, the piston plate and bushing being configured such that the bushing is connectable to the piston plate after piston plate is connected to the housing such that the piston plate centers the bushing and the bushing centers the turbine and the input shaft of the transmission after being connected to the piston plate, the radial flange contacting a radially extending portion of the piston plate, both the radial flange and the axial flange of the bushing contacting the turbine hub.

12. The torque converter as recited in claim 11 wherein an end of the piston plate connected to the bushing has an L shape and an outside corner of the L shape of the piston plate fits directly against an inside corner of the L shape of the bushing.

\* \* \* \* \*